(Model.)

W. H. PAYNE.
HARVESTER BINDER.

No. 303,746. Patented Aug. 19, 1884.

Witnesses
H. C. Coclief
G. E. Faulkner.

Inventor
William H. Payne

By Coburn & Thacher
Attorneys (Model.)

W. H. PAYNE.
HARVESTER BINDER.

No. 303,746. Patented Aug. 19, 1884.

(Model.)

W. H. PAYNE.
HARVESTER BINDER.

No. 303,746. Patented Aug. 19, 1884.

Fig. 24.

Witnesses
Inventor
Wm H. Payne
his Attorney

UNITED STATES PATENT OFFICE.

WILLIAM H. PAYNE, OF JANESVILLE, WISCONSIN, ASSIGNOR OF ONE-FIFTH TO CHARLES F. CRAVER, ALONZO STEELE, AND MICHAEL AUSTIN, OF GRINNELL, IOWA.

HARVESTER-BINDER.

SPECIFICATION forming part of Letters Patent No. 303,746, dated August 19, 1884.

Application filed May 18, 1882. (Model.)

*To all whom it may concern:*

Be it known that I, WM. H. PAYNE, of Janesville, county of Rock, and State of Wisconsin, have invented new and useful Improvements in Harvester-Binders; and I do hereby declare the following to be a full, clear, and exact description of the same.

My invention relates to binding attachments for grain-harvesters, the particular form in which the invention is embodied being adapted to binding with twine, though many of the details of construction are equally applicable to other kinds of binders.

The machine is represented in the accompanying drawings, in which Fig. 2 is a detail plan view of the binding mechanism; Fig. 3, an end elevation of one of the compressors, Fig. 4 a side elevation of the other.

My invention belongs more particularly to that class of binders in which a revolving plate operates the various mechanisms in action during the operation of binding a sheaf.

I have not shown in the drawings the cutting mechanism, that being, as I use it, of ordinary construction and operation.

Figure 1:
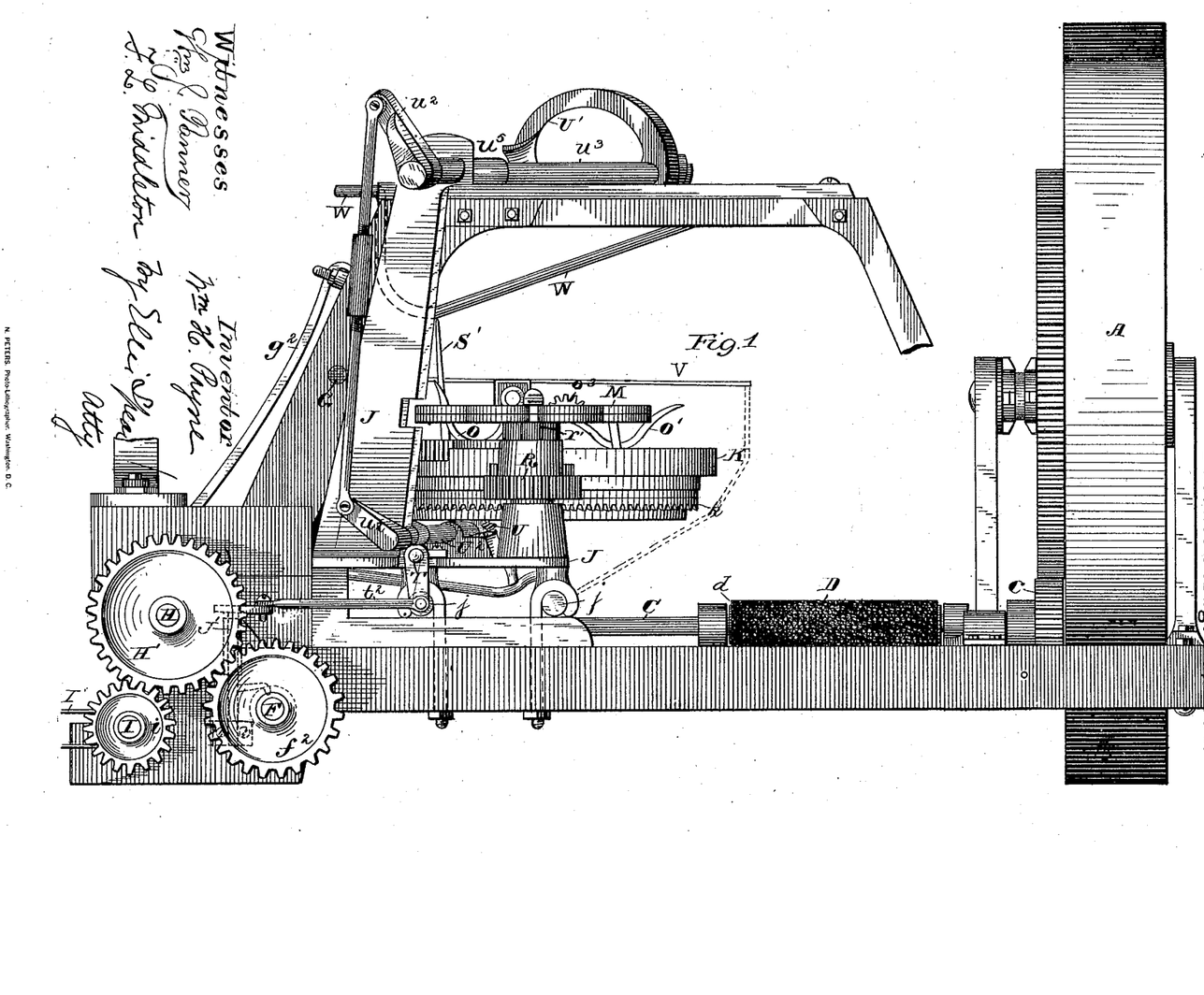
Figure 1 is a rear elevation of a machine embodying my improvements.
Figure 6:
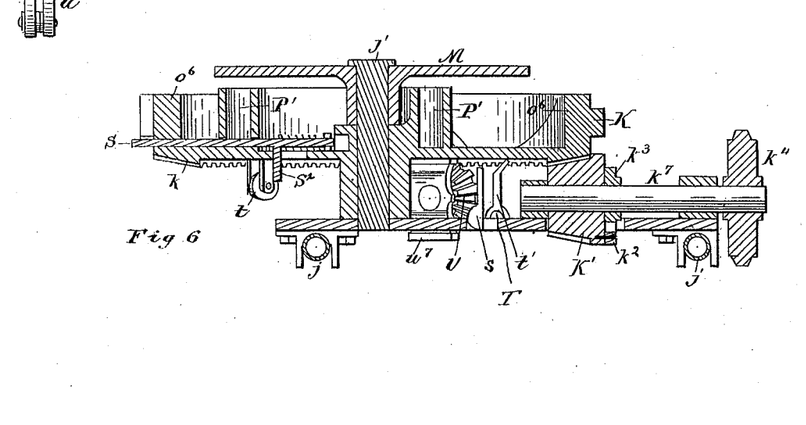
Fig. 6, a detail transverse vertical section on the line $y\,y$ of Fig. 2.
Figure 7:
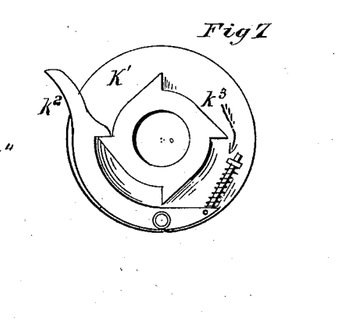
Fig. 7, a detail end view of the clutch and pinion driving the binding mechanism.

The frame J, which supports the binding mechanism, is mounted on parallel rods or gas-pipes $j\,j$, so as to slide thereon, and be adjusted endwise to different lengths of grain. A vertical pivot, $j'$, is set in this frame, and upon it is mounted the main gear-wheel K of the binder. Underneath, near its periphery, this wheel is provided with a complete circular rack, $k$, and into this meshes the driving-pinion K'. (See Figs. 2, 5, and 6.) This pinion is loose so as to revolve on the shaft $k'$, but is held in place against longitudinal movement thereon. It is connected to, so as to rotate with, the shaft by means of a clutching spring-dog, $k^2$, Figs. 2, 6, and 7, which is pivoted on the pinion K', and engages with a ratchet-wheel, $k^3$, fixed to the shaft, so that when the dog is in place, as shown in Fig. 7, the pinion is rotated with the shaft and the wheel K is thereby rotated. Motion is communicated to this shaft through a sprocket-wheel, $k^4$, and a chain connecting it with another sprocket-wheel, $c^2$, on the end of the shaft C, which is directly driven by the gear on the main drive-wheel A, as shown in Fig. 1. The shaft $k'$ therefore revolves continually, but its action upon the binder driving-wheel K depends upon the position of the clutch-dog $k^2$. Normally this dog is held in engagement with the ratchet-wheel $k^3$ by means of the spring shown in Fig. 7; but it is capable of being thrown out of engagement by mechanism hereinafter described. This disconnection of the wheel K from the shaft $k'$ is for the purpose of momentarily arresting the wheel when the binding mechanisms are in proper positions to receive the gavel, in order to give time for the reception of the gavel. During all other times the wheel K is in revolution.

The mechanism for throwing the clutch-dog out of engagement with the ratchet-wheel $k^3$ consists of a bolt, S, in the wheel K, which is forced forward by a suitable spring, as shown, so as to cause the bolt to project outside of the periphery of this wheel. When so projecting and moving with the wheel, it strikes the projecting end of the dog $k^2$, Fig. 7, whereby said dog is thrown out of engagement with the ratchet-wheel $k^3$, and the shaft $k^7$ may revolve while the pinion K' and wheel K stand still, for the purpose hereinbefore explained. On the binder-frame, in suitable bearings, is a horizontal rock-shaft, carrying an upright arm, S', Figs. 1, 2, and 5, and on the other or inner end of the shaft is a broad curved spur, $s$, the curve being shown in Fig. 2 in dotted lines, and an end elevation of the same being shown in full lines in Fig. 6. The arm S' projects above the platform V, on which the grain is delivered from the carrier, and is held normally in a vertical position by means of a spring coiled about its shaft, and suitably connected to the shaft and the frame J. When so held, the spur $s$ is in the position shown in Fig. 6; but when the arm S' is pressed back by the accumulation of grain delivered to the platform sufficient to form a gavel, it gives a corresponding movement to the spur $s$, which acts upon the downwardly-projecting arm $S^2$ of the bolt S. It will be understood that the spur $s$ is so located that when the projecting end of the bolt S has pushed away the clutch-dog so as to disconnect the driving mechanism from the main wheel K, the said spur will be opposite the downwardly-projecting arm $S^2$ of the bolt S. Therefore, when the arm S' is pressed back, as heretofore explained, the bolt S will be withdrawn and the dog $k^2$ permitted to re-engage with the ratchet-wheel $k^3$ of the shaft $k^7$, when the pinion K' and this main wheel K will resume their rotation. It may be stated here in general terms that the movement of said wheel K from this point shifts the gavel to bring it underneath the binder-arm, by which the twine is passed around it.

I proceed now to explain more particularly the various mechanisms for moving the gavel and the binding-arm, and for knotting the twine.

Figure 22:
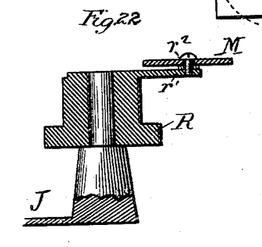
Fig. 22 is a detail view, partly in section, representing the connection of the wheel R and its arm with the binder-plate.
Figure 23:
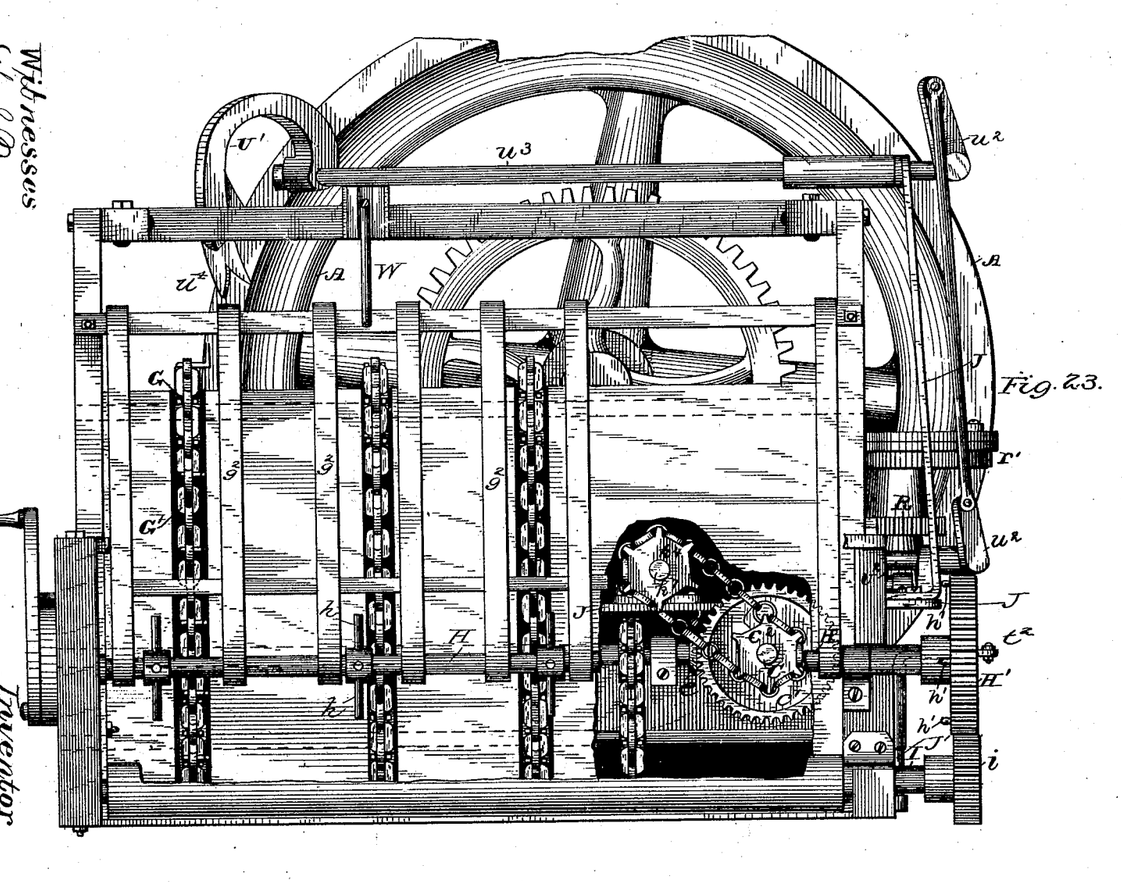
Fig. 23 is a side view of the machine with some of the parts broken away to show the operating mechanism.
Figure 24:
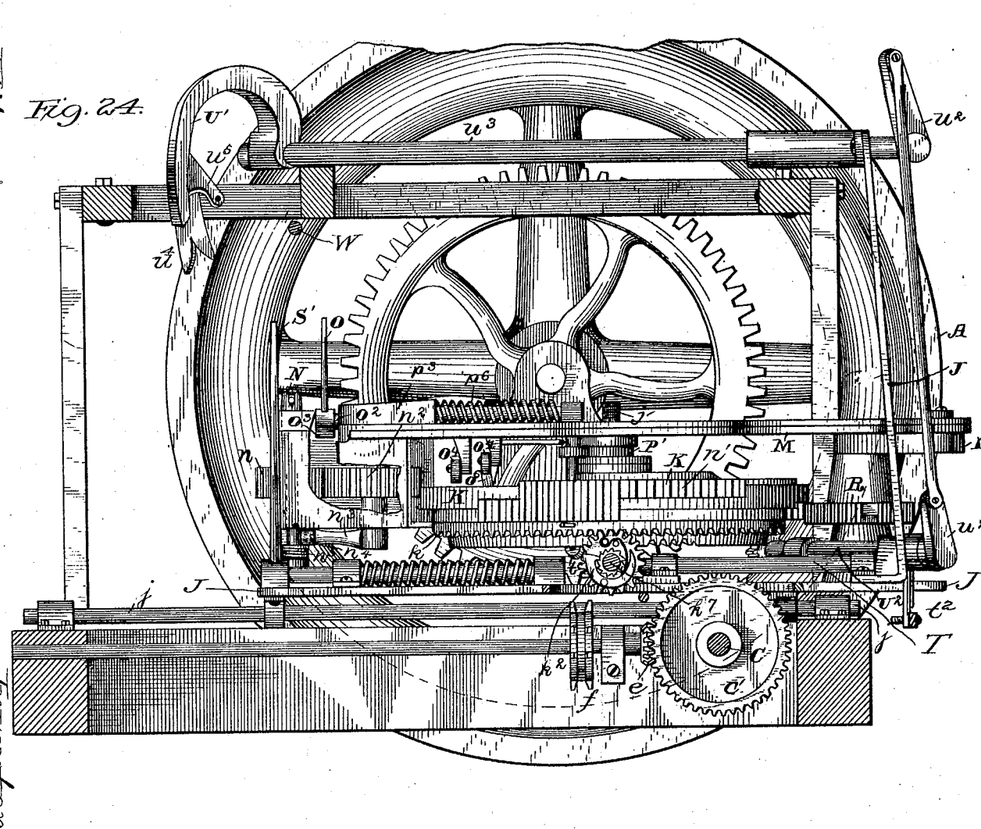
Fig. 24 is a side elevation of the machine with the elevating mechanism and platform V removed.

Directly over the wheel K, and mounted to turn upon the same spindle, $j'$, is the binder-plate M. (Shown in plan in Fig. 2, and in section in Figs. 5 and 6.) Its general location is across the machine from front to rear, and a little distance back from the delivery-point of the elevator, as shown in Fig. 1. It carries upon one end the compressor-arms and all the tying mechanisms. The other end is slotted, as shown at $r^2$ in Figs. 2 and 5, and in this slot works the pin of a crank-arm, $r'$, fixed to the upper end of the hub of a horizontal gear-wheel, R, which turns upon a pin set in the main binder-frame J, in the position shown in Figs. 1 and 2, and in detail in Fig. 22. These parts are so arranged that a partial revolution of the gear-wheel R will throw the other end of the frame carrying the binding mechanism from a position beneath the binder-arm to a position close to the delivery end of the elevator, and the continued movement in the same direction of the gear-wheel R, to complete its revolution, will carry the same end back to its original position under the arm. This movement, referred to hereinafter, shifts the binding mechanism and compressor-arms into a position to receive the gavel, and then transfer it to the binder-arm, where it receives the twine and is bound, and the movements of all those parts are timed to accord with this shifting movement.

Figures 2, 3, 4:
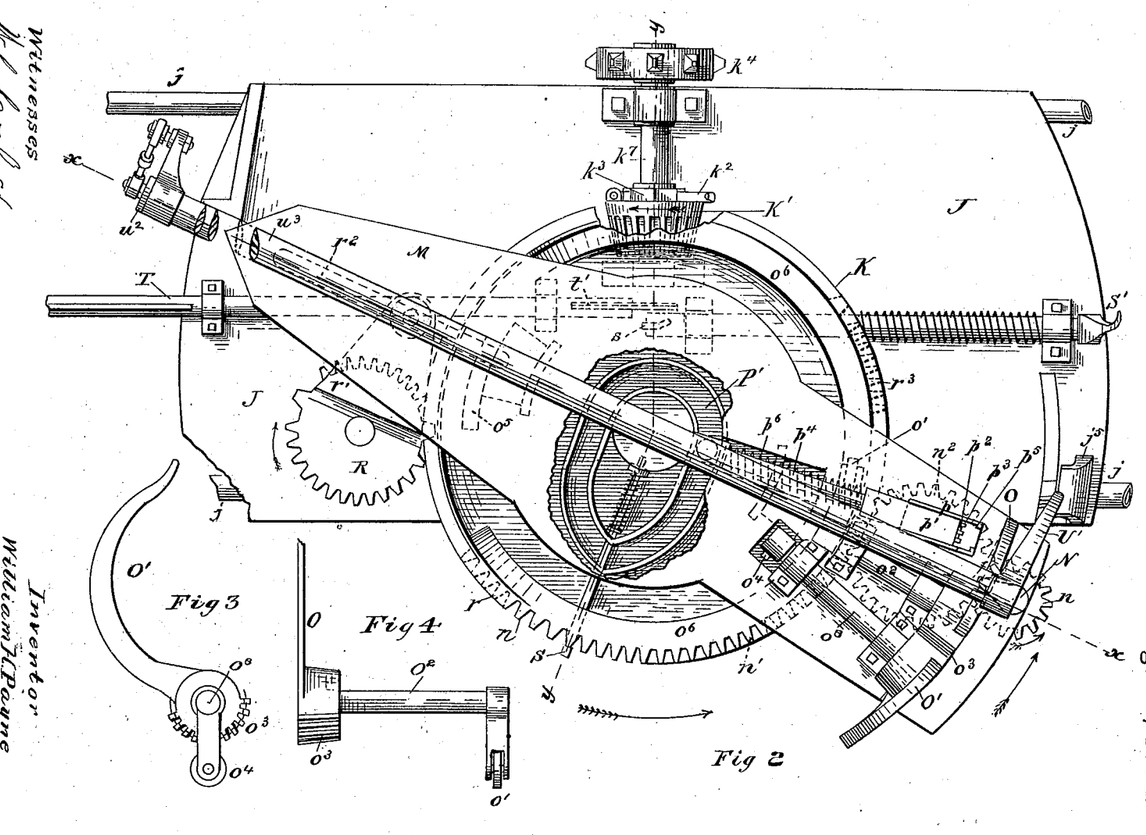
Figure 5:
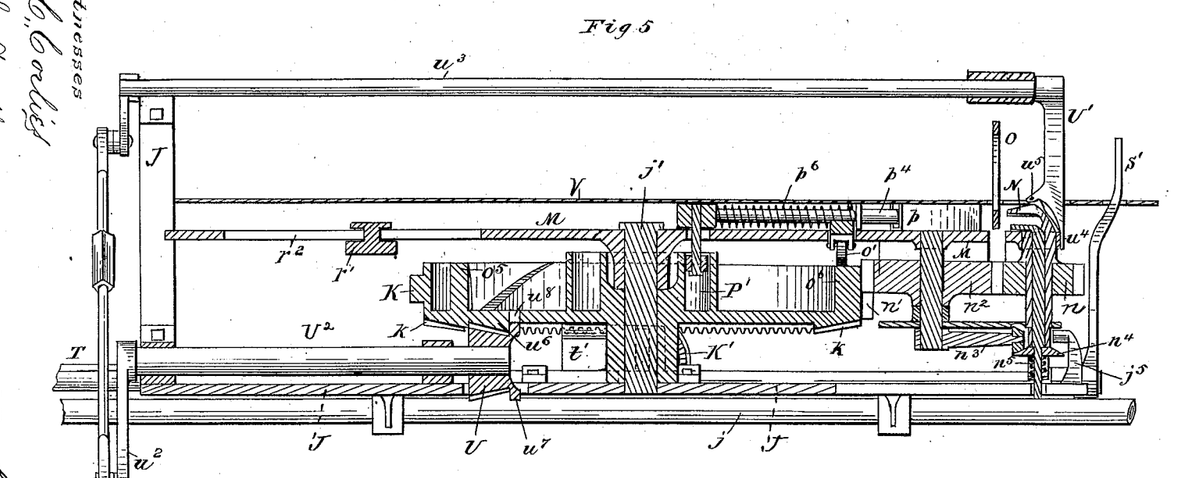
Fig. 5, a detail vertical section on the line $x\,x$ of Fig. 2.

The position of the binder-arm is shown in Figs. 2 and 5, in which the plate M is shifted to bring the binding mechanism under the arm. The binder-arm U' is fixed to the shaft $u^3$, hung in suitable bearings, supported on the binder-frame, (so that the binder-arm shaft is always held in the same relation to the tying mechanism when the binder-frame is moved on the rod $j$.) This shaft is rocked by means of a crank-arm on its end, opposite the binder-arm, connected to a crank, $u^2$, on the end of the shaft $U^2$, mounted in bearings on the binder-frame, and carrying a bevel-pinion, U, Figs. 1, 5, and 17, which meshes into curved segmental racks $u'$ $u^6$ on the wheel K, Fig. 10. It will be apparent that only about a half-revolution is required of the pinion U to raise or lower the binder-arm, and the length of the racks $u'$ $u^6$ is exactly adapted to cause such half-revolution, and they are so located on the wheel K in relation to the other racks and mechanisms that the binder-arm will be brought down directly after the gavel has been shifted to its place beneath it, and will be held down until the bundle has been bound and the plate M has nearly completed its inward movement. The pinion U is provided on its outer face with delay-surfaces $u^7$, which engage the lower face of the wheel K in the parts between the racks, and prevent rotation of the pinion when disengaged from said racks. Upon reaching the racks the delay-surfaces $u^7$ move into the curved slots $u^8$, thereby permitting the pinion to rotate. The cranks heretofore described in connection with the binder-arm are so arranged that one rotation of the pinion U in one direction will raise and lower the said arm.

Figure 8:
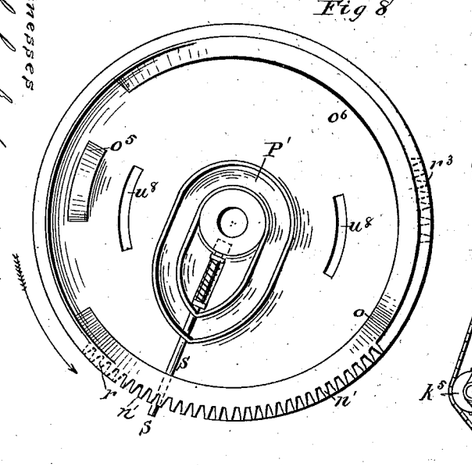
Fig. 8, a detail plan view of the main gear-wheel for driving the binding mechanism.
Figure 9:
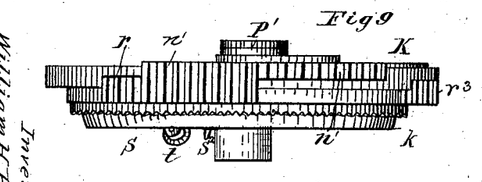
Fig. 9, a side elevation of the same.

The compressor-arms O O' are mounted on shafts $o^2$ $o^8$ in suitable bearings on the plate M. These shafts are provided with gears $o^3$, which mesh into each other and cause the shafts to move simultaneously, whichever shaft be acted upon. They have sufficient movement in opening to drop the points of the compressor-arms below the plate M and platform V, so as to clear the incoming gavel, and sufficient movement in closing to properly compress the gavel. On the inner ends of these shafts are arms having friction-rollers $o'$ $o^4$, which ride upon cam-tracks on the upper face of the wheel K, thereby opening or closing the arms. The wheel $o'$ of the shaft $o^2$ serves to close the arms by riding upon the camway $o^6$, Figs. 2, 5, 6, and 8. This camway, extending nearly the entire circumference of the wheel K, holds the compressor-arms in a closed position while the plate M is shifting its position and while the operations necessary for the tying of the twine are going on. It may here also be noted that the rear end of the cam-track (the wheel K always moving in the direction of the arrow) is slightly raised, the rise begining at o, Fig. 8, so as to impart to the compressor-arms at that point additional compression in order to loosen the twine while the knot-tying mechanism is at work, this incline o being located at such a position upon the wheel in respect to the other parts that the increased pressure will be applied at the moment when the forming of the loop for the knot commences. The arms are opened by means of the wheel $o^4$ on the arm of the shaft $o^8$ striking the cam $o^5$, Figs. 2, 5, and 8. This is a short cam, just sufficient to throw down the compressor-arms, this action taking place just before the plate M is shifted into a position near the delivery of the elevator. The cam $o^5$ is simply a plain elevated track in the path of the wheel $o^4$, and is adapted to open the compressor-arms and there leave them.

The position of the knot-tying mechanism is shown in Figs. 2 and 5. A duck-bill, N, is formed on two shafts—one shaft within the other—as shown more clearly in Fig. 5. The outer shaft is provided with the pinion $n$, by which both it and the inner shaft are turned, the inner turning with the outer. The upper jaw of the duck-bill has no vertical movement, the outer shaft simply turning in its bearings. The inner shaft, carrying the lower jaw, is adapted to slide vertically. It has on its extension, below the outer shaft and above its lower bearing, a beveled collar, $n^4$, and a spring, $n^5$, between the collar and the lower bar of a frame secured to the plate M, which frame incloses and supports the whole tyer. The spring pressing upward constantly holds the jaws normally in a closed position. The jaws are opened by means of a beveled antifriction roller on the end of an arm, $n^3$, of a vertical shaft mounted in suitable bearings in the plate M, and carrying a pinion, $n^2$, gearing with the pinion $n$ on the shaft of the duck-bill. The pinion $n$, rotating the duck-bill, is moved through the pinion $n^2$ by means of a segmental rack, $n'$, on the periphery of the wheel K. The position of this segmental rack, as shown, is such that its forward end strikes the pinion $n^2$ as soon as the binder-arm has descended to carry the twine around the gavel. The duck-bill previous to this is turned away from the position of the twine, the latter being carried between it and the compressor-arms. The duck-bill then turns toward the twine to form a loop, the bill reaching about the position which it occupied at the beginning of the movement. During this part of the movement the jaws are closed, and the increased pressure of the compressor-arms gives up slack to form the loop. At the beginning of the second revolution of the tyer-shafts the roller on the arm $n^3$ strikes the collar $n^4$, depressing it and opening the jaws, and, as the duck-bill turns with the jaws open, it seizes the ends of the twine extending from the holding mechanism, hereinafter described. The jaws are held open only for an instant, while the roller on the arm $n^3$ is passing the collar, when the spring forces up the under jaw to grasp the twine received between it and the upper one. The jaws having seized the twine, the revolution of the duck-bill continues until the bill points to the rear, when the compressor-arms are opened by reason of the cam-track $o^6$ terminating sooner than the rack which operates the tying mechanism. The binder-plate M at this instant commences its return, while the binder-arm remains down. The binder-arm is provided with a stripper, $w^4$, projecting so as to lie close to the path of the duck-bill, and as the plate M moves back it carries the duck-bill close to this stripper, which thereupon pushes off the loop over the cord held in the jaws, thus completing the knot and permitting the bundle to fall upon the discharging-apron. In order to insure the release of the cord ends to permit the discharge of the bundle, a cam, $j^5$, is located on the binder-frame J in proper place to depress the collar $n^4$ of the knotter-shaft and open the bill. At the proper time—i. e., directly after the tying-jaws close—the cutting mechanism operates, as hereinafter described, to sever the cord.

Figures 10, 11, 12, 13, 14, 15, 17, 18:
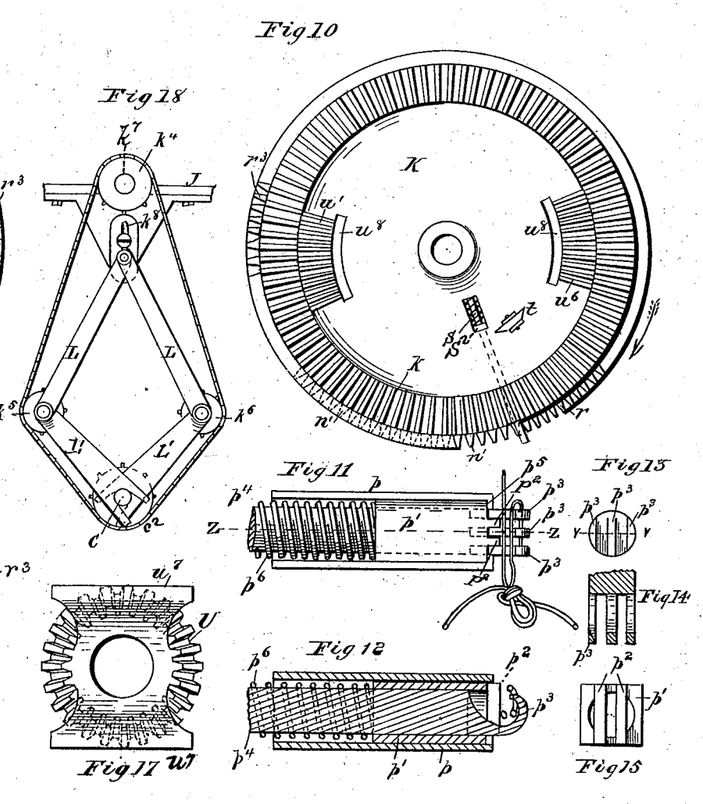
Fig. 10, a bottom plan view of the same.
Fig. 11, a plan view of the cord-holder and cutter, the jaws being shown in the act of opening to release the bundle and admit the cord for another bundle.
Fig. 12, a vertical section of the same, taken on the line $z\,z$ of Fig. 11.
Fig. 13, an end elevation of one of the jaws of the cord-holder.
Fig. 14, a horizontal section of the same, taken on the line $v\,v$ of Fig. 13.
Fig. 15, an end view of the other jaw of the cord-holder.
Fig. 17, a detail elevation of the stop-pinion operating the binder-arm.
Fig. 18, an elevation of the automatic chain-tightener.
Figure 16:
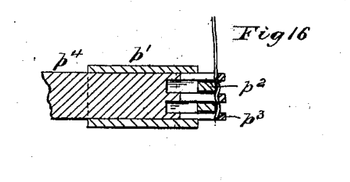
Fig. 16, a detail section of the cord-holder with the jaws closed.
Figure 19:
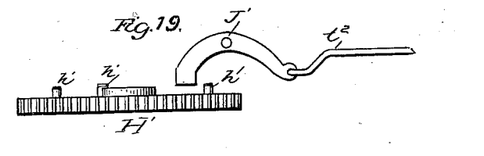
Figs. 19, 20, and 21, detail views of the stop mechanism for the separation of grain for the bundles.

The cutting and holding mechanism is shown in place in Figs. 2 and 5 and elsewhere in detail views. It consists of a hollow casing, $p'$, open in front and rear, except that across its front end are placed two vertical bars, $p^2$. This case incloses part of the sliding shank $p^4$, which carries the hooks $p^3$, that grasp and cut the twine. These hooks, it will be observed, move in and out close to the bars $p^2$, the middle one between the two bars $p^2$, and the two outside hooks outside the said bars. The shank $p^4$, which carries the hooks $p^3$, extends inwardly toward the pivot of the plate M, as shown in Figs. 2 and 5, and is provided with a downwardly-projecting arm having an antifriction roller on its lower end engaging with a cam, P', on the hub of the wheel K, as shown. Between the collar on the rear end of the shank $p^4$ and the rear end of the casing $p'$ is a spring, $p^6$, which normally holds the shank back, so as to draw the hooks $p^3$ between the bars $p^2$ on the front end of the casing. The casing is inclosed in a shell, $p$, open at front and rear, and in this shell the casing has a limited longitudinal movement. The device for limiting this movement at the front end consists of a shoulder, $p^5$, on the shell $p$, Fig. 11. Upon the first forward movement—that is to say, when the high part of the cam P' begins to act upon the shank $p^4$—it pushes forward the whole twine-holding apparatus without any relative movement of the shank to the case, until the case reaches the stop or shoulder $p^5$, where it is arrested, while the shank $p^4$ continues its movement, thus thrusting out the hooks away from the bars and openings, the holder to take in the new end of the twine. The hook $p^3$ nearest the duck-bill is sharpened, so that as it passes its bar $p^2$ it will act as a cutter and sever the twine, while the other hooks are blunt and simply clamp the twine between their faces and those of the bar $p^2$, which they inclose. The movement of the cutting and holding apparatus is so timed by means of the shape and location of the cam P', as shown more clearly in Figs. 2 and 8, that the hooks are drawn back after the duck-bill has seized the end of the cord, which, as before stated, occurs after the loop is formed. Immediately after the ends are so seized the shank is drawn back and the cord severed on that side next the duck-bill; but the shape of the cam also is such that it has thrust forward the case to its full extent within the shell, and the hooks to their full extent outside this case and in the path of the twine leading from the end of the binder-arm, so that this part of the twine drops into the space between the hooks and the bars, as shown in Fig. 11. Thus the cord is severed and the bundle permitted to fall off by the simultaneous or nearly simultaneous opening of the compressor-arms. Immediately after this, in the manner before explained, the compressor-arms are thrown down by means of the cam $o^5$ and the wheel $o^4$ on the arm of the shaft $o^8$, and the segment-rack $r^3$ reaches the wheel R, engaging with its cogs, and thereby, through the devices and with the results heretofore explained, shifting the binding mechanism from the tying position to the position where it receives the gavel. After the binder-plate M has been thus shifted, the bolt S trips the dog $k^2$ and stops the wheel until enough grain from the elevator has accumulated against the trip-lever S' to force back the bolt S and permit the dog to engage with the driving mechanism, and thus start the wheel K.

It will be understood that if during the binding operation described sufficient grain has not accumulated to press back the lever S', the wheel K will stop, having made one revolution; but if sufficient grain should have accumulated against the lever to withdraw the spring-bolt within this revolution, the wheel will continue to revolve.

I have provided special mechanism for separating the grain for the different bundles. This is accomplished by stopping temporarily the arms $h$ on the shaft H, while the teeth $g$ on the elevator-chains G', carried on the roller G, and a roller on the shaft F are continuing their movement. This shaft H, with its arms, takes up the grain from the platform-conveyer I' and feeds it to the elevator-chains G', and if arrested in its movement it holds back the grain from the elevator, permitting the latter to carry what grain is upon it and deliver it to the binder.

Figure 20:
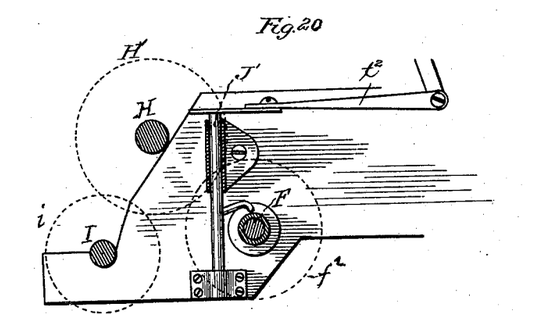
Figure 21:
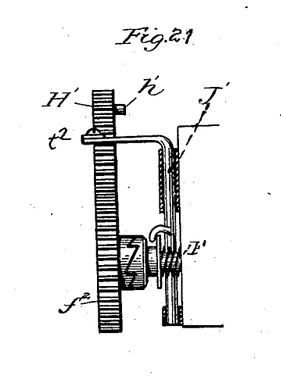

In order that the shaft H may be controlled from the main wheel K of the binding mechanism, I mount on the binder-frame, in suitable bearings, a rock-shaft, T, Figs. 1, 2, 5, and 6. On the inner end is a broad arm, $t'$, Figs. 5 and 6, which is in the path of a beveled roller, $t$, mounted in suitable hangers on the under side of the wheel K, Figs. 1, 6, 9, and 10, which roller, coming in contact with said arm, rocks the shaft T. The arm $t'$ is made in length sufficient to hold the arresting mechanism long enough to separate the grain, however much it may be entangled. The rock-shaft T extends beyond the binder-frame, and is there provided with a crank-arm, which a connecting-rod, $t^2$, joins to an arm fixed on the vertical rock-shaft J', as shown in Figs. 1, 20, and 21, which shaft rocks in bearings on the frame of the machine. The lower end of the shaft J' is provided with another arm, which works an ordinary spring-clutch on the shaft F, which spring-clutch engages with its fellow on the loose wheel $f^2$. The construction is such that when the elongated arm $t'$ is pressed to the left of the machine, or toward the driver, the shaft T is rocked, and also the shaft J', and this presses back the spring-clutch and leaves the wheel or pinion $f^2$ loose on the shaft. The shaft is driven constantly and carries the elevator; but the shaft H and (through its gear-wheel H') the shaft I are driven from the gear-wheel $f^2$ and stop with it. In order to insure the prompt arresting of the wheel H', pins $h'$ are set on its inner face in a line with the prolonged end of the upper arm on the shaft J', as shown in Figs. 1, 19, 21, and 23. By the movement of the arm $t'$ toward the driver, as described, the rod $t^2$ is drawn in the opposite direction and the end of the upper arm on the shaft J' is thrown into the paths of the pins $h'$ at the same time that the clutch releases the wheel H'.

It will be borne in mind that the binder-frame J is adjustable on the parallel rods $j$ to adapt it to the different lengths of grain, and with it of course all the binding mechanism proper is moved, the binder-plate M and the binder-arm being mounted on said frame; but the shaft $k^7$, through which the main binder-wheel K is rotated, is driven, as heretofore explained, by means of a sprocket-wheel, $k^4$, connected by a chain to the sprocket-wheel $c^2$ on the shaft C. In order that the chain may be always kept under proper tension, I have provided a mechanism shown in Fig. 18. In this there are sprocket-wheels $k^5$ $k^6$, mounted on pivots of the toggle-levers L L', which levers are suspended in a hanger from the frame J, and at the lower ends are pivotally connected to the shaft C. The upper of said levers has a set-screw, and a slot, $k^8$, in the hangers, to facilitate the adjustment of the chain. By means of this device the chain is automatically kept taut, whatever the position of the binder-plate.

On the upper part of the main frame of the machine, and somewhat beyond the binder-platform, is pivoted a bar, W, the free end of which lies over the platform within reach of the driver, and is adjustable, so as to be set at different heights and there held by suitable notches and a spring-catch. This bar is pivoted on the side toward the discharging-apron, and its pivoted end is the higher at all times, whether the free end be adjusted high or low. Thus the passage from the receiving side to the discharging-apron constantly grows wider. The vertical adjustment of the bar regulates the grain passing under it, and also flattens it down, so that as the compressor-arms close to form the bundle they form it in a flat oval shape; but as they move toward the apron the vertical space increases, and when the arms are in the position where the bundle is bound and receive their final movement, to give additional compression to the bundle, (not being until then fully closed,) they round up the bundle by lateral compression, by reason of the increased space, permitting the bundle to expand slowly in an upward direction.

The timing and operation of the parts of the machine may be summarized as follows: Grain is delivered upon the receiver or grain-table V in the usual manner until enough accumulates to operate the trip-lever S', when the wheel K is set in motion, thereby stopping the rotary lifting-arms $h$, to make a perfect separation of incoming grain from the bundle to be bound. The compressors close around the bundle, and to a certain extent round it. The bundle is moved from the receiver by the oscillation of the binder-plate carrying the compressor-arms. The end of the cord being held in the holding-jaws $p^2 p^3$, the cord is placed over the bundle by means of the binder-arm, the end $n^4$ of which catches the cord between the eye $u^5$ and the top of the bundle and lays it parallel with the under cord, passing from the holder and into the path of the knotter, and in the path of and slightly below the upper side of the curved holder-hooks $p^5$. The knotter is operated and simultaneously the bundle is compressed to give slack cord during the forming of the loop. The cord is grasped by the holder, seized by the tyer-jaws, and cut, leaving the end in the holder for a new bundle. The compressors are then lowered from around the bundle, the binder-plate is moved back, and after the tightening of the knot the bundle and cord are released from the knotter by the binder-arm still remaining depressed, or by the cam $j^5$ striking and depressing the collar $n^4$ of the knotter-shaft, thus leaving the bundle free to fall upon the discharging-apron D. The binding mechanism stops by tripping the clutch of its own driving-pinion until again started by the accumulation of grain against the trip-lever. The apron D is supported upon the roller $d$ on the shaft C and a suitable roller at the other end, and the apron is arranged low in rear of and beneath the binding mechanism, so that the dropped sheaf is caught thereby and carried to the rear.

The device used in connection with the elevator for holding down the grain consists of yielding bars, (shown at $g^2$ in Figs. 1 and 23,) extending down above the elevating-chain, so as to include, in whole or in part, the space in which move the arms $h$ of the shaft H.

Having thus described my invention, what I claim as new, and desire to secure by Letters Patent, is—

1. In a harvester-binder, the combination of the binder-frame J, adjustable on a line parallel with the grain as it is delivered from the harvester, the shifting binder-plate, and the intermediate operating mechanism, substantially as described, mounted upon said frame, a binder-arm shaft mounted in bearings, also on said frame, and the connecting mechanism between the driving mechanism of the binder and the main driving mechanism of the machine, all substantially as set forth.

2. In a grain-binding mechanism, the combination of a binder-arm, a binding-frame, a shifting plate pivoted on said frame, the pair of compressor-arms pivoted directly on the plate, tying, holding, and cutting mechanisms, devices for shifting said plate, and devices for operating the said tying, holding, and cutting mechanisms, all substantially as described.

3. In a grain-binder, the combination of a binding-frame, a shifting plate pivoted thereon, and carrying the pair of compressor-arms pivoted thereon, the tying, holding, and cutting mechanisms, mechanism for moving said plate, and a wheel, K, for operating the specified mechanisms, substantially as set forth.

4. In a grain-binder, the combination of the shifting plate M, provided with compressor-arms, mounted upon rock-shafts having arms at their inner ends adapted to be moved by the cams of the driving-wheel, a shifting-pinion, R, and an arm connecting said pinion with the slotted end of the plate M, and a driving-wheel, K, having cams to operate the compressor-arms, and segment-gears to operate the pinion R, substantially as described.

5. In combination with the plate M and its shifting apparatus, the twine cutting and holding mechanism, substantially as described, and the cam P' on the driving-wheel K.

6. The described cutting and holding mechanism, consisting of the case $p'$, having the bars $p^2$, the shank $p^4$, carrying-hooks $p^3$, the spring $p^6$, and the inclosing-shell $p$, having stop $p^5$, and the cam on the wheel K, the whole combined together, substantially as described.

7. The tying mechanism consisting of the duck-bill provided with inner and outer shafts, pinion $n$, collar $n^4$, and spring $n^5$, in combination with the pinion $n^2$, driving-wheel K, and an arm, $n^3$, the parts being adapted to operate substantially as described.

8. The plate M, carrying the compressor-arms, in combination with the wheel K, having a rack engaging with a driving-pinion, the cam $o$ $o^6$, to close and hold the compressor-arms, and the cam $o^5$, to open the same, all as set forth.

9. The driving-wheel K, having cams $o$ $o^5$ $o^6$, as described, and segmental racks $r$ $r^3$, in combination with the compressor-arms, pinion R, and shifting mechanism, substantially as described.

10. In a grain-binder, the combination of a wheel, K, adapted to operate the holding and tying mechanism, and provided with a continuous rack, $k$, with the loose pinion K' on the shaft $k^7$, a dog and ratchet connection between said shaft and pinion, means for imparting continuous movement to the shaft, and a tripping mechanism on the wheel K, adapted to be operated by the lever S', and suitable intermediate connections, substantially as described.

11. The combination of the lever S', its rock-shaft and arm $s$, wheel K, the tripping-bolt on said wheel provided with a spring and a retracting arm, the loose pinion K', the driving-shaft $k^7$, and the dog and connecting devices, substantially as described.

12. In a grain-binder, the combination of the shifting plate carrying the devices necessary to compress and tie the bundle, mechanism for driving said devices, a shaft carrying the binder-arm, the driving-wheel K, and the shaft carrying the pinion U, adapted to engage in segmental racks in said drive-wheel and connected by cranks and a pitman to the shaft of the binder-arm, substantially as described.

13. The mechanism for separating the grain, consisting of a conveyer and elevator, in combination with the shaft H, provided with elevating-arms $h$, mechanism whereby the drive-wheel of said shaft is connected with or disconnected from the main driving mechanism, and devices, substantially as described, for operating said connecting and disconnecting mechanism by the revolution of the binding mechanism, substantially as described.

14. The shaft H, provided with elevating-arms $h$, the rock-shaft T, having an arm, $t'$, connecting-rod $t^2$, attached to an arm of the rock-shaft J', and a clutch mechanism on the shaft F, whereby the pinion which communicates motion to the shaft H is disconnected from its shaft and allowed to rest, and a wheel, $t$, on the drive-wheel K, the parts being combined and operating as set forth.

15. The rock-shaft T, adapted to be rocked by a projection on the wheel K, a rod connecting the crank-arm of said shaft to the arm of the rock-shaft J', the clutch mechanism for connecting or disconnecting the shaft F with or from its pinion, the projection on the end of the upper arm of the shaft J', and pins $h'$ on the gear-wheel H', the parts being combined and operating in the machine substantially as described.

16. The combination of the binder-frame, the binder-plate carrying the compressor-arms and tying mechanism, and adapted to oscillate between the delivering end of the elevator and the discharging-apron, mechanism, substantially as described, for operating said binder-plate, a binder-arm on a shaft having its bearings on the binder-frame, and mechanism, substantially as described, whereby the binding-arm is held in position to discharge the bundle when the binder-plate is moving back, as set forth.

17. The bar W, pivoted on the main frame on the side next the discharge-apron, and having the inner free end within reach of the driver, in combination with the compressor-arms O O', mounted on the binder-plate, the parts being constructed and operating substantially as described.

WILLIAM H. PAYNE.

Witnesses:
GEO. R. CUTLER,
THOMAS H. PEASE.